United States Patent
Cabras et al.

(10) Patent No.: US 12,533,534 B2
(45) Date of Patent: Jan. 27, 2026

(54) DEVICE AND METHOD FOR POSITIONING A MEDICAL APPLIANCE

(71) Applicants: UNIVERSITE DE STRASBOURG, Strasbourg (FR); CENTRE NATIONAL DE LA RECHERCHE SCIENTIFIQUE, Paris (FR); HÔPITAUX UNIVERSITAIRES DE STRASBOURG (HUS), Strasbourg (FR)

(72) Inventors: Paolo Cabras, Strasbourg (FR); Jonathan Vappou, Strasbourg (FR); Benoît Wach, Strasbourg (FR); Afshin Gangi, Strasbourg (FR)

(73) Assignees: UNIVERSITE DE STRASBOURG, Strasbourg (FR); CENTRE NATIONAL DE LA RECHERCHE SCIENTIFIQUE, Paris (FR); HOPITAUX UNIVERSITAIRES DE STRASBOURG (HUS), Strasbourg (FR)

( * ) Notice: Subject to any disclaimer, the term of this patent is extended or adjusted under 35 U.S.C. 154(b) by 276 days.

(21) Appl. No.: 18/251,192

(22) PCT Filed: Nov. 5, 2021

(86) PCT No.: PCT/EP2021/080775
§ 371 (c)(1),
(2) Date: Apr. 28, 2023

(87) PCT Pub. No.: WO2022/096645
PCT Pub. Date: May 12, 2022

(65) Prior Publication Data
US 2023/0405363 A1    Dec. 21, 2023

(30) Foreign Application Priority Data
Nov. 6, 2020   (EP) .................................... 20306348

(51) Int. Cl.
*A61N 7/02*       (2006.01)
*A61B 90/50*     (2016.01)
*A61B 17/00*     (2006.01)

(52) U.S. Cl.
CPC ................ *A61N 7/02* (2013.01); *A61B 90/50* (2016.02); *A61B 2017/00566* (2013.01); *A61B 2017/00911* (2013.01)

(58) Field of Classification Search
CPC .......... A61B 90/50; A61B 2017/00566; A61B 2017/00911; A61B 90/11; A61B 2017/00858; A61B 2017/3405
See application file for complete search history.

(56) References Cited

U.S. PATENT DOCUMENTS

| | | | |
|---|---|---|---|
| 2014/0343563 A1 | 11/2014 | Pretre et al. | |
| 2016/0106508 A1* | 4/2016 | Lathrop | A61B 90/14 606/130 |

(Continued)

FOREIGN PATENT DOCUMENTS

| | | |
|---|---|---|
| EP | 2082701 A1 | 7/2009 |
| JP | 2013059589 A | 4/2013 |

(Continued)

OTHER PUBLICATIONS

International Search Report and Written Opinion received for PCT/EP2021/080775, mailed Feb. 3, 2022.

(Continued)

*Primary Examiner* — Julian W Woo
(74) *Attorney, Agent, or Firm* — Greer, Burns & Crain, Ltd

(57) ABSTRACT

A device for positioning a medical appliance in an operational position with respect to a patient, includes
 a bearing element configured to receive the medical appliance;

(Continued)

at least two compressible chambers containing a frictional jamming material capable of exhibiting frictional jamming when air is removed from the chambers, the chambers being coupled to the bearing element; wherein:

in a non-actuated configuration, the bearing element is adapted to be positioned in the operational position, and the chambers are configured to move the bearing element according to six degrees of freedom, and in an actuated configuration, the frictional jamming material is subjected to frictional jamming, thereby allowing for the chambers to become rigid and the bearing element to be fixedly positioned, wherein the device is configured to be self-supporting in the actuated configuration. The disclosure also relates to a system and a method for positioning a medical appliance.

12 Claims, 2 Drawing Sheets

(56) References Cited

U.S. PATENT DOCUMENTS

2017/0360589 A1\* 12/2017 Corrigan ............... F16M 13/00
2020/0170732 A1    6/2020 Patriciu

FOREIGN PATENT DOCUMENTS

WO    2018084869 A1    5/2018
WO    2019207322 A1    10/2019

OTHER PUBLICATIONS

European Search Report received for Application No. 20306348, dated Apr. 12, 2021.

\* cited by examiner

[Fig. 1]
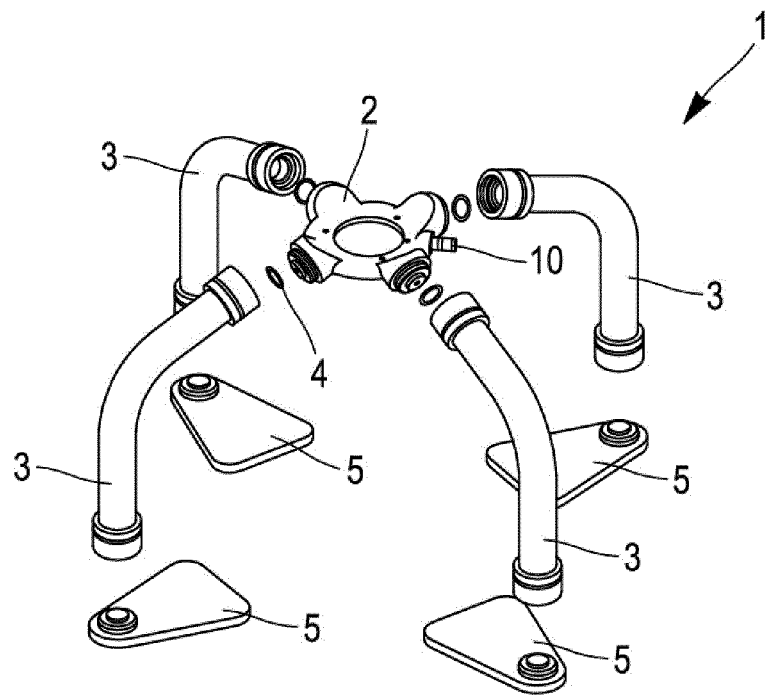
[Fig. 2]
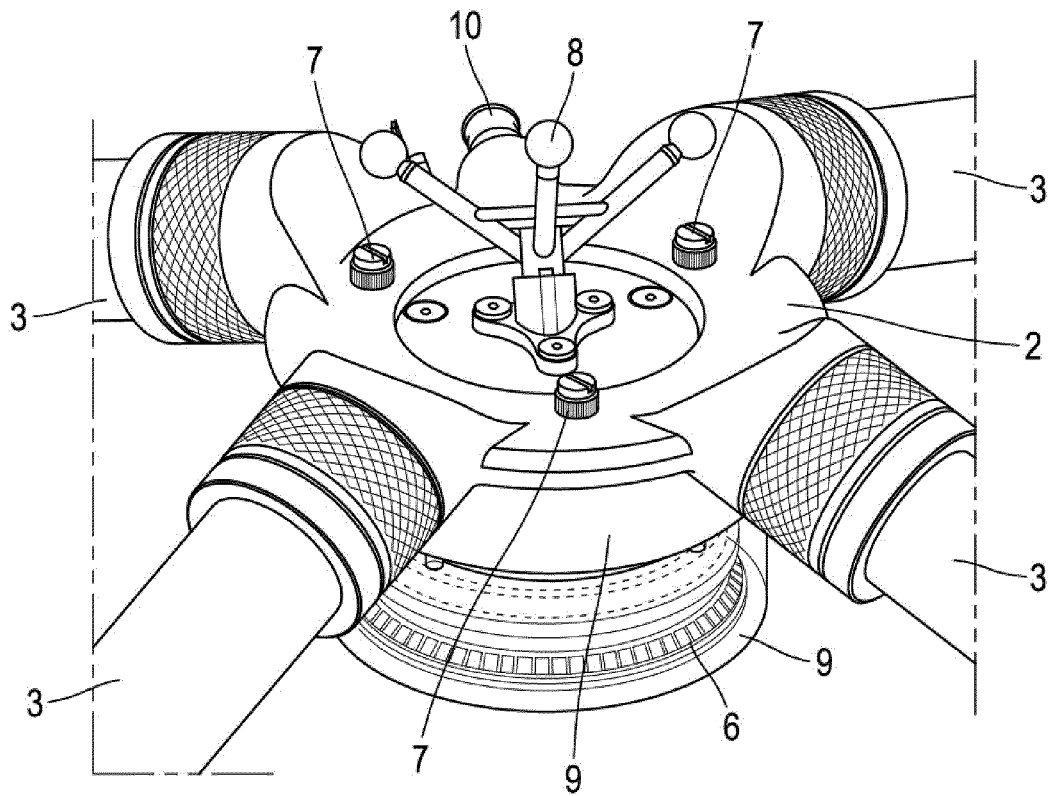

[Fig. 3]
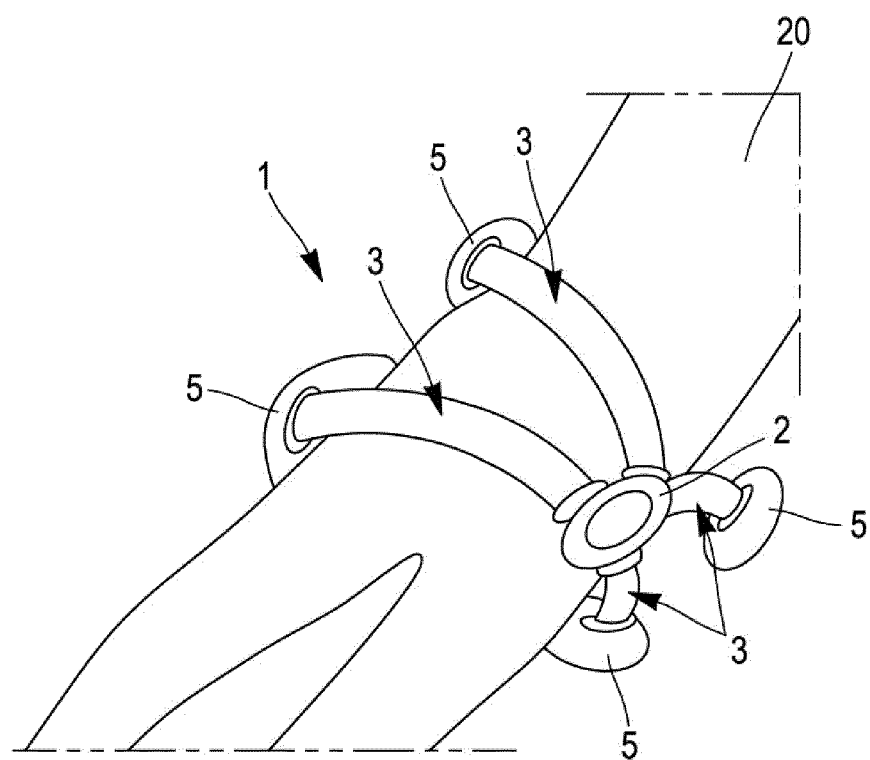

DEVICE AND METHOD FOR POSITIONING A MEDICAL APPLIANCE

BACKGROUND

The present invention relates to a device and a method for positioning a medical appliance.

In a wide variety of applications, medical appliances such as surgery tools, imaging devices, or transducers, need to be held in a static fashion with respect of an area to be treated on a patient, to avoid any movement of these appliances with respect to the patient.

In particular, high-intensity focused ultrasound (HIFU) is a non-invasive and non-ionizing therapeutic technique to treat areas of the body. For example, HIFU can be used to ablate pathological tissues such as benign or malignant tumors using thermal effects, or to permeabilize tissues for localized drug delivery. HIFU may also be implemented with esthetic applications such as face lifting.

Such HIFU treatments may be realized on any part of the human body. It is therefore necessary to precisely position and hold the HIFU transducer with respect to the treatment area.

In magnetic resonance imaging (MRI) environments, existing positioning systems include specific scanner tables with a concave multi-element ultrasound transducer separated from the patient by a water bladder. Such a table is used, for example, for the ablation of uterine fibroids.

Another example is a multi-element transducer array arranged around the head of the patient with a water bladder, specifically conceived for the treatment of neurological diseases, such as essential tremor and Parkinsonian tremor.

However, these systems are cumbersome and complex. They are limited to specific applications or areas of the body, and very expensive. They do not allow to freely position the transducer directly on the treatment area.

Similar limitations occur with positioning systems for other medical appliances, such as biopsy grids, needle holders, MR Coils, etc.

An object of the present invention is to provide a device for positioning a medical appliance overcoming the described drawbacks of the prior art.

SUMMARY

According to an aspect of the present invention, there is provided a device for positioning a medical appliance in an operational position with respect to a patient, the device comprising:
- a bearing element configured to receive the medical appliance;
- at least two compressible chambers containing a frictional jamming material capable of exhibiting frictional jamming when air is removed from the chambers, the chambers being coupled to the bearing element;

wherein:
- in a non-actuated configuration, the bearing element is adapted to be positioned in the operational position, and the chambers are configured to move the bearing element according to six degrees of freedom, and
- in an actuated configuration, the frictional jamming material is subjected to frictional jamming, thereby allowing for the chambers to become rigid and the bearing element to be fixedly positioned.

Preferably, the device is configured to be self-supporting in the actuated configuration.

Preferably, the device according to the invention is a device for positioning the medical appliance in an magnetic resonance imaging (MRI) examination room.

The device according to the invention can be completely made of MRI-compatible materials, and/or can be completely made of non ferromagnetic materials, preferably can be completely made of non magnetic materials.

The device according to the invention can be arranged for fitting within an MRI bore and/or for fitting in a cylindrical volume with a diameter of 70 cm or less, or even preferably 60 cm or less.

The device according to the present invention allows for positioning the medical appliance directly on or near the area of the body to be treated. It offers six degrees of freedom to an operator to move the medical appliance attached to the bearing element such as it would be freely moved around by hand.

The medical appliance, such as a transducer, may be rapidly and easily placed as desired and then locked in place by removing air from the chambers in a single operation. Indeed, thanks to the frictional jamming material comprised by the chambers, these are deformable in a non-actuated configuration, when air is present in the chambers. The bearing element attached to the chambers may be freely moved. In an actuated configuration, when air is evacuated from the chambers and a depression is created therein, the frictional jamming material is subjected to frictional jamming, thereby allowing for the chambers to become rigid and the bearing element, and thus the medical appliance attached thereto, to be locked in position. It is possible to switch between the rigid and the supple state of the chambers within a few seconds.

By means of the device according to the present invention, it is possible to position and hold the medical appliance in place thanks to the actuated and non-actuated configurations of the chambers. No rigid support structure integrated with the device and maintaining the chambers is needed to realize secure positioning and holding.

Once the chambers are in the actuated configuration, the device is self-supporting. Thanks to the plurality of actuated chambers acting as legs of the device, the device is able to stand in a stable manner, for example on a table. The chambers, and thus the device, do not need to be fixed or attached to a support. The device can thus be freely manipulated by an operator and readily transported to and put in place wherever it is needed.

Thanks to the self-supporting feature and the possibility to freely move the medical appliance attached to it, the device according to the invention can be implemented very easily.

Any kind of medical appliance may be held and positioned with the device according to the present invention. The medical appliances may include ultrasound transducers, needle holders, biopsy grids, MR Coils, etc.

In particular, the device is configured to position and hold medical appliances of different types, sizes, and weights. For example, the medial appliances may have weights up to 4 kg, typically between 200 g and 4 kg, and more particularly between 300 g and 3 kg.

Advantageously, the device may be set in intermediate configurations between the actuated and the non-actuated configurations. These intermediate configurations may be obtained by varying the vacuum level within the chambers, thereby attaining different stiffness or flexibility levels of the chambers. Such intermediate configurations may be useful for refining the positioning of the medical appliance, restrain movements or facilitate finer movements, etc.

The chambers may be of any form and size suitable for the desired application. In particular, the chambers may be configured to be placed around any part of the body of a patient. For example, it is possible to choose elongated chambers of small diameter to place the medical appliance on a leg or an arm of the patient. According to another example, the chambers may be pillow-shaped in order to be adapted to be placed around the patient's head. Advantageously, the chambers may have different sizes and/or forms, allowing the medical appliance to be positioned in more eccentric positions.

Additionally, the device according to the present invention provides a low-cost, mobile, and space-saving alternative to existing positioning and/or supporting systems. No specific operation or scanner table is needed. It is compatible with surgical environments, and provides great adaptability to any application where a medical appliance needs to be manually positioned.

Advantageously, since the device can be made of non-magnetic materials without compromising its positioning and holding features, and since it is a pneumatically-actuated system containing no electric components, it is also completely compatible with a magnetic resonance imaging (MRI) environment. Compatibility with the MRI environment involves the use of non magnetic materials, for both safety and image quality reasons. Moreover, the device should fit in a highly constrained environment: the diameter of the MRI bore (tunnel) is typically 60-70 cm, and any device positioned on or near the patient needs to be fitted in the highly restricted space between the patient and the bore wall. Thus, the device according to the invention preferably fits in a cylindrical volume with a diameter of 70 cm, or even preferably 60 cm.

In the following, it is to be understood that the term "device (or method, or system) for positioning" is intended to indicate "device (or method, or system) for holding", since the medical appliance is held in place once the chambers rigidified.

The chambers, or bladders, are made of a supple and elastic material, such as latex.

The device according to the invention comprises a vacuum connector configured to connect a vacuum source to it. Preferably, the device comprises a unique air circuit, comprising a single vacuum connector on the bearing element fluidically connected to the chambers, allowing for evacuating air from all the chambers in a single step.

Advantageously, an end of the chambers may be adaptable to a fixed structure.

The fixed structure may be, for example, a scanner table of a magnetic resonance imaging (MRI) scanner or operation table receiving the patient.

According to a first variant, the frictional jamming material may comprise granular material.

The granular material may comprise polymer balls, sand, glass beads, quartz beads, etc., or a mixture thereof.

According to another variant, the frictional jamming material may comprise at least one stack of a plurality of flexible sheets.

According to still another variant, the frictional jamming material may comprise a plurality of fibers or threads of an appropriate material.

The choice of the type of frictional material may be adapted according to the shape and size of the chambers.

In a preferred embodiment, the chambers may be of an elongated, tube-like shape.

The chambers may be connected to the bearing element on one end, the other end being adaptable to a fixed structure This shape confers the positioning device a flared structure allowing an operator to have a clear, unobstructed visual contact with the medical appliance to be positioned.

Also, the overall open-worked structure of the device allows for easily adapting the number of chambers and to freely positioning them around the patient.

According to an embodiment, the device may further comprise one or more base elements connected to the chambers and configured to be adaptable to a fixed structure.

A base element may be connected to each chamber.

The base element may be adaptable to the fixed structure by ballasting them with weights, or by positioning them under the patient.

Advantageously, the chambers may be removable from the bearing element and may be interchangeable.

Accordingly, it is possible to choose and adapt the shapes or lengths, or even the number of the chambers to a specific application. Thus, the medical appliance may be positioned in multiple configurations.

According to another aspect of the present invention, there is provided a system for positioning a medical appliance in an operational position with respect to a patient, the system comprising:
a positioning device according to the invention;
monitoring means configured to monitor the positioning of the medical appliance in real time.

The monitoring means allow for increasing the precision of positioning. The monitoring means may include, for example, a tracking camera.

In an embodiment, the system may further comprise control means configured to remotely control the positioning of the medical appliance under the supervision of an operator by the monitoring means.

Optical tracking markers may be provided on the medical appliance in order to control its positioning with a tracking camera.

For example, a tracking camera may be coupled to a virtual reality interface, by means of which the medical appliance may be directly positioned at the desired position by the operator.

According to yet another aspect of the present invention, there is provided a method for positioning a medical appliance in an operational position with respect to a patient. The method comprises the following steps:
fixing the medical appliance on a bearing element of a positioning device, the bearing element being connected to at least two compressible chambers containing a frictional jamming material capable of exhibiting frictional jamming when air is removed from the chambers;
positioning the bearing element in the operational position, the chambers being configured to move the bearing element according to six degrees of freedom; and
removing air from the chambers, thereby subjecting the frictional jamming material to frictional jamming, allowing for the chambers to become rigid and the bearing element to be fixedly positioned, in an actuated configuration.

The positioning device is preferably:
configured to be self-supporting in the actuated configuration, and/or
being self-supporting in the actuated configuration.

In the method according to the invention, the medical appliance is preferably positioned in an magnetic resonance imaging (MRI) examination room.

The used positioning device can be completely made of MRI-compatible materials, and/or can be completely made of non ferromagnetic materials, preferably can be completely made of non magnetic materials.

The used positioning device can fit within the MRI bore of the MRI examination room and/or can fit in a cylindrical volume with a diameter of 70 cm or less, or even preferably 60 cm or less.

The device, system, and/or method according to aspects of the present invention may be used for the positioning of an ultrasound transducer for ultrasound therapy.

More particularly, the device, the system, and/or the method according to aspects of the present invention may be implemented on an MRI table in an MRI environment, wherein the transducer is a high intensity focused ultrasound (HIFU) transducer. The MRI allows for monitoring the HIFU therapy by real-time tissue temperature measurements, as well as for positioning the transducer with millimeter precision.

BRIEF DESCRIPTION OF THE DRAWINGS

Other advantages and features of the invention will become apparent by reference to the following detailed description of illustrative embodiments thereof, and from the accompanying drawings, wherein:

FIG. 1 schematically depicts a positioning device in accordance with an illustrative embodiment of the invention, FIG. 2 shows a detail of a device, with a medical appliance attached thereto, in accordance with an illustrative embodiment of the invention, and FIG. 3 schematically depicts a positioning device in accordance with another illustrative embodiment of the invention.

DETAILED DESCRIPTION

It is well understood that the embodiments which will be described hereinafter are in no way limitative. Variants of the invention can be considered comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the Figures, the elements that are common to several Figures may keep the same reference.

FIG. 1 schematically represents a device according to an embodiment of the present invention in an exploded view.

The device 1 comprises a bearing element 2. This bearing element 2 is intended to receive and hold a medical appliance to be positioned with respect to a patient, such as a transducer.

As represented in FIG. 1, the device comprises four compressible chambers 3. The chambers 3 have an elongated, tube-like shape, such as legs. The chambers 3 are releasably attached on one end to the bearing element 2 by way of a screw connection. A seal ring 4 may be provided within the screw connection. The chambers 3 may be attached to the bearing element by any other suitable releasable attachment means.

Preferably, the chambers are made of latex, presenting high elasticity.

The chambers 3 contain a frictional jamming material.

The jamming material may consist of a granular jamming material, including polymer balls such as polypropylene balls, sand, glass or silica granules, quartz beads, or the like.

Alternatively, the jamming material may consist of planar flexible sheets stacked on one another. The sheets may be of plastic material, or any other flexible material presenting a similar friction coefficient.

According to still another variant, the jamming material may comprise fibers or threads of an appropriate material such as plastic material, or any other flexible material presenting a similar friction coefficient.

Of course, the device 1 may also comprise two, three, or more than four compressible chambers. The chambers may be differently shaped, as required by the intended application.

As the chambers are removable from the bearing element, they may be interchanged with other chambers. For example, according to the desired application (for example, the position of the medical appliance with respect to the patient), chambers of different sizes and/or shapes may be chosen.

The device 1 according to the embodiment represented in FIG. 1 also comprises four base elements 5, one for each chamber 3. The base elements 5 are attached to the chambers 3 by a screw connection (in FIG. 1, they are shown detached).

The base elements 5 are in the shape of plates extending from the end attached to the chambers. These plates may be ballasted to keep the device in place on a support, such as a patient's table. The base elements may also be placed under the patient, when appropriate. It is not necessary to fix the chambers 3 or the base elements 5 to the support by screws, clamps, adhesion tapes, or any other fixing or attachment means FIG. 2 shows a detail of the device 1 according to an embodiment. In the illustrated embodiment, the medical appliance is an ultrasound transducer 6, such as an HIFU transducer. The transducer 6 is attached to the bearing element 2 by screws 7. The four chambers 3 are attached to the bearing element 2 by screw connections. The ultrasound transducer 6 is arranged within a water-filled, water-tight casing 9. The casing 9 may be equipped with hydraulic connectors (not shown) to fill and empty the casing with water or other acoustic coupling fluids.

FIG. 3 schematically represents a device according to another embodiment of the present invention.

In this embodiment, the device 1 has four leg-shaped chambers 3, of which two are shorter than the other two. As illustrated in FIG. 3, the device 1 according to this example is adapted to position a medical appliance (not shown) on the left side of the hips of a patient 20. A bone lesion located in this area may for example be treated this way. To fix the device 1, the base elements 5 are chocked under the patient 20 who is lying on a table.

As shown in FIGS. 1 and 2, the bearing element 2 is equipped with a vacuum connector 10 configured for connecting a vacuum pump or equipment, for example vacuum plug of an operating room. The vacuum connector may comprise a vacuum valve. All the chambers 3 may be evacuated via a unique air circuit using this single vacuum connector 10. Of course, other configurations of air circuits are possible.

A system for positioning a medical appliance according to embodiments of the present invention comprises a positioning device as described here above, as well as monitoring means to monitor the positioning of the transducer in real time.

The system may further comprise control means configured to remotely control the positioning of the medical appliance under the supervision of an operator by the monitoring means.

For example, a real-time navigation system with a tracking camera may be provided to track the positioning of the medical appliance in real time. The camera may be coupled to a virtual reality interface, by means of which the operator may locate the desired position and directly bring the medical appliance to that position.

Specifically, in the embodiment as illustrated in FIG. 2, the medical appliance is a HIFU transducer 6. The HIFU transducer 6 is equipped with optical tracking markers 8 to enable its positioning by means of the control means. As shown in FIG. 2, the optical tracking markers 8 are of gadolinium adapted to be recognized in an MRI environment. The markers 8 may be used to realize the matching between MRI images and the tracking images of a tracking camera. The control means may also be configured to electronically steer the HIFU transducer 6 in order to adjust small positioning errors of the operator.

A method for positioning a medical appliance in an operational position with respect to a patient according to embodiments if the present invention is described in the following.

First, compressible chambers having suitable shapes and sizes for the envisaged application are chosen and attached to a bearing element. The chambers may be leg-shaped as the ones described with reference to FIG. 1. The legs may also have different lengths, as shown in FIG. 3.

A medical appliance, such as an ultrasound transducer, is fixed to the bearing element, for example by screws. These screws are selected to be adapted to MRI environment. The appliance is preferably held within a water-tight casing.

The device comprising the bearing element with the medical appliance and the chambers is then placed near the patient. For example, the device may be placed like an arc over the patient lying on a scanner table, or like an arc specifically over the patient's members. The chambers are in a non-activated condition, i.e., flexible and with air within them. The device is fixed, for example, by ballasting base plates attached to the chambers.

Once the device in place, the operator moves the medical appliance in the desired position near the area to be treated. Thanks to the flexible chambers, the operator may take the bearing element and place the medical appliance as needed. In the case of an ultrasound transducer, there must be no air on the propagation path of the ultrasound waves. The transducer may be placed directly onto the skin of the patient, possibly using an acoustic gel to provide the ultrasonic coupling, or a water bladder may be placed between the transducer and the patient.

Once the medical appliance correctly positioned, the air present in the chambers is evacuated by actuating a vacuum pump coupled to the bearing element or to the chambers. The vacuum can be created in the chambers using a switch located either on the appliance or on the vacuum source. The material in the chambers will undergo frictional jamming, and the chambers will thus become rigid. The medical appliance is fixedly held in place.

We note that for each previously described example embodiment of the device according to the invention:

this device is preferably a device for positioning the medical appliance 6 in an magnetic resonance imaging (MRI) examination room, and the device is preferably completely made of MRI-compatible materials, and/or is preferably completely made of non ferromagnetic materials, preferably completely made of non magnetic materials, and the device is preferably arranged for fitting within an MRI bore and/or for fitting in a cylindrical volume with a diameter of 70 cm or less, or even preferably 60 cm or less.

While this invention has been described in conjunction with a number of embodiments, it is evident that many alternatives, modifications, and variations would be or are apparent to those of ordinary skill in the applicable arts. Accordingly, it is intended to embrace all such alternatives, modifications, equivalents, and variations that are within the spirit and scope of this invention.

The invention claimed is:

1. A device for positioning a medical appliance in an operational position with respect to any part of a body of a patient, the device comprising:
   a bearing element configured to receive the medical appliance; and
   at least two compressible chambers containing a frictional jamming material capable of exhibiting frictional jamming when air is removed from the chambers, the chambers each being of an elongated, tube-like shape with at least one end and each being coupled to the bearing element on one of said at least one end;
   wherein:
   in a non-actuated configuration, the bearing element is adapted to be positioned in the operational position, the chambers being configured such that the bearing element is movable according to six degrees of freedom, and
   in an actuated configuration, the frictional jamming material is subjected to frictional jamming, thereby allowing for the chambers to become rigid legs of the device, and for the bearing element to be fixedly positioned,
   wherein the device is configured to be self-supporting in the actuated configuration.

2. The device according to claim 1, characterized in that the device is a device for positioning the medical appliance in a magnetic resonance imaging (MRI) examination room, and characterized in that:
   the device is completely made of non magnetic materials, and
   the device is arranged for fitting within a cylindrical volume with a diameter of 70 cm or less.

3. The device according to claim 1, wherein an end of the chambers is adaptable to a fixed structure.

4. The device according to claim 1, wherein the frictional jamming material comprises granular material.

5. The device according to claim 1, wherein the frictional jamming material comprises at least one stack of a plurality of flexible sheets.

6. The device according to claim 1, further comprising one or more base elements connected to the chambers and configured to be adaptable to a fixed structure.

7. The device according to claim 1, wherein the chambers are removable from the bearing element and interchangeable.

8. The device according to claim 1, wherein a vacuum source is operationally coupleable to the bearing element, the at least two chambers being fluidically connected to the bearing element.

9. A system for positioning a medical appliance in an operational position with respect to any part of a body of a patient, the system comprising:
a device according to claim 1;
monitoring means configured to monitor the positioning of the medical appliance in real time.

10. The system according to claim 9, further comprising control means configured to remotely control the positioning of the medical appliance under the supervision of an operator by the monitoring means.

11. A method for positioning a medical appliance in an operational position with respect to any part of a body of a patient, the method comprising:
fixing the medical appliance on a bearing element of a positioning device, the positioning device comprising at least two compressible chambers containing a frictional jamming material capable of exhibiting frictional jamming when air is removed from the chambers, the chambers being of an elongated, tube-like shape having at least one end and being coupled to the bearing element on one of said at least one end;
positioning the bearing element in the operational position, the chambers being configured such that the bearing element is movable according to six degrees of freedom; and
removing air from the chambers, thereby subjecting the frictional jamming material to frictional jamming, allowing for the chambers to become rigid legs of the positioning device and for the bearing element to be fixedly positioned, in an actuated configuration,
wherein the positioning device is configured to be self-supporting in the actuated configuration.

12. The method according to claim 11, characterized in that the medical appliance is positioned in a magnetic resonance imaging (MRI) examination room, and in that:
the positioning device is completely made of non magnetic materials, and
the positioning device fits within a cylindrical volume with a diameter of 70 cm or less.

\* \* \* \* \*